US012667925B2

(12) United States Patent
Giusti et al.

(10) Patent No.: US 12,667,925 B2
(45) Date of Patent: Jun. 30, 2026

(54) PORTABLE DEVICE FOR MACHINING A WORKPIECE

(71) Applicant: EPUR, Rodome (FR)

(72) Inventors: Pierre Giusti, Espezel (FR); Denis Vinet, Belbeze en Comminges (FR); Olivier Clair, Rodome (FR)

(73) Assignee: EPUR, Rodome (FR)

( * ) Notice: Subject to any disclaimer, the term of this patent is extended or adjusted under 35 U.S.C. 154(b) by 610 days.

(21) Appl. No.: 17/795,732

(22) PCT Filed: Jan. 21, 2021

(86) PCT No.: PCT/FR2021/050105
§ 371 (c)(1),
(2) Date: Jul. 27, 2022

(87) PCT Pub. No.: WO2021/152239
PCT Pub. Date: Aug. 5, 2021

(65) Prior Publication Data
US 2023/0100775 A1 Mar. 30, 2023

(30) Foreign Application Priority Data

Jan. 27, 2020 (FR) ...................................... 2000758

(51) Int. Cl.
*B23Q 9/00* (2006.01)
*B23Q 1/62* (2006.01)
(Continued)

(52) U.S. Cl.
CPC ........... *B23Q 9/0042* (2013.01); *B23Q 1/621* (2013.01); *B23Q 9/02* (2013.01); *B27C 5/06* (2013.01); *B27C 9/02* (2013.01)

(58) Field of Classification Search
CPC ........ B23Q 9/0042; B23Q 1/621; B23Q 9/02; B27C 5/06; B27C 9/02; B27C 5/00; B27C 9/00
See application file for complete search history.

(56) References Cited

U.S. PATENT DOCUMENTS 3,700,344 A 10/1972 Grumbach
4,805,500 A * 2/1989 Saito ........................ B27B 31/06
83/390

(Continued)

FOREIGN PATENT DOCUMENTS

FR 3050135 A1 * 10/2017 ............... B27C 5/02
WO WO-2004069501 A2 * 8/2004 ............. B23B 51/06

OTHER PUBLICATIONS

WO-2004069501-A2 translation, 2004 (Year: 2004).*

*Primary Examiner* — Jonathan G Riley
(74) *Attorney, Agent, or Firm* — CRGO Global; Steven M. Greenberg

(57) ABSTRACT

The invention relates to a portable digitally controlled device for machining a workpiece (10) comprising a machining module (200) which comprises: at least one machining head bearing a machining tool; means for moving the machining head along at least two axes perpendicular to each other; a digital control unit configured to be able to control the means for moving the machining head, characterized in that the machining device further comprises a module (100) for clamping the machining module to the workpiece, the clamping module (100) comprising: means for removably attaching (106, 108; 130) the clamping module (100) to the workpiece (10); means for removably mounting (142, 144) the machining module (200) to the clamping module (100).

9 Claims, 3 Drawing Sheets

(51) Int. Cl.
  B23Q 9/02   (2006.01)
  B27C 5/06   (2006.01)
  B27C 9/02   (2006.01)

(56)       References Cited

U.S. PATENT DOCUMENTS 5,172,618 A * 12/1992 Moriya ................ B23D 55/043
                                                                83/365
5,494,089 A     2/1996 Lubbe

* cited by examiner

[Fig. 1]
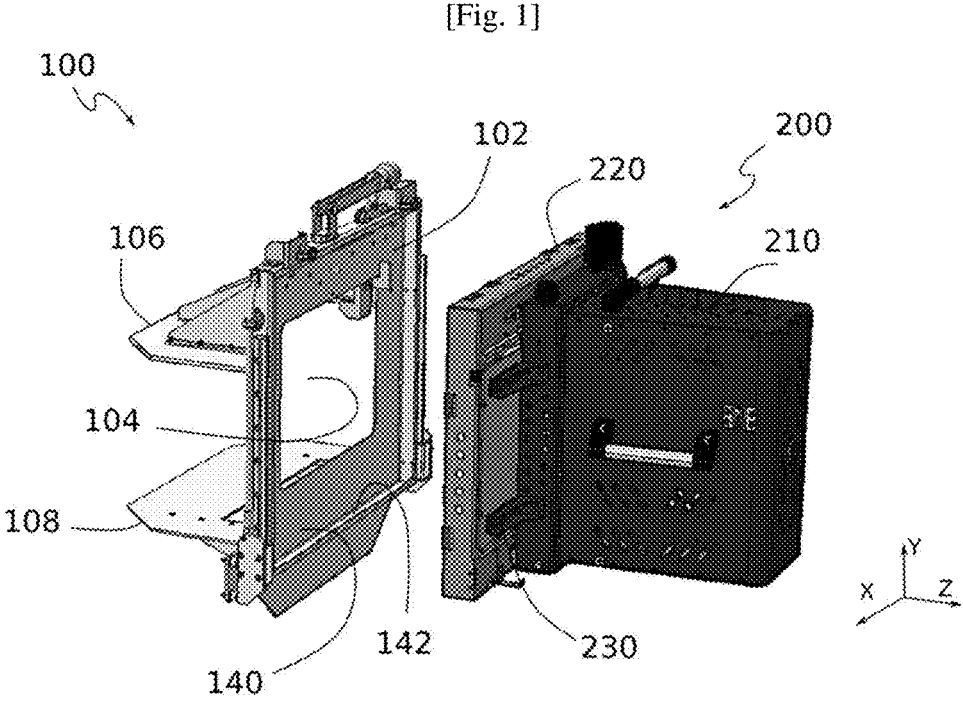
[Fig. 2]

[Fig. 3]
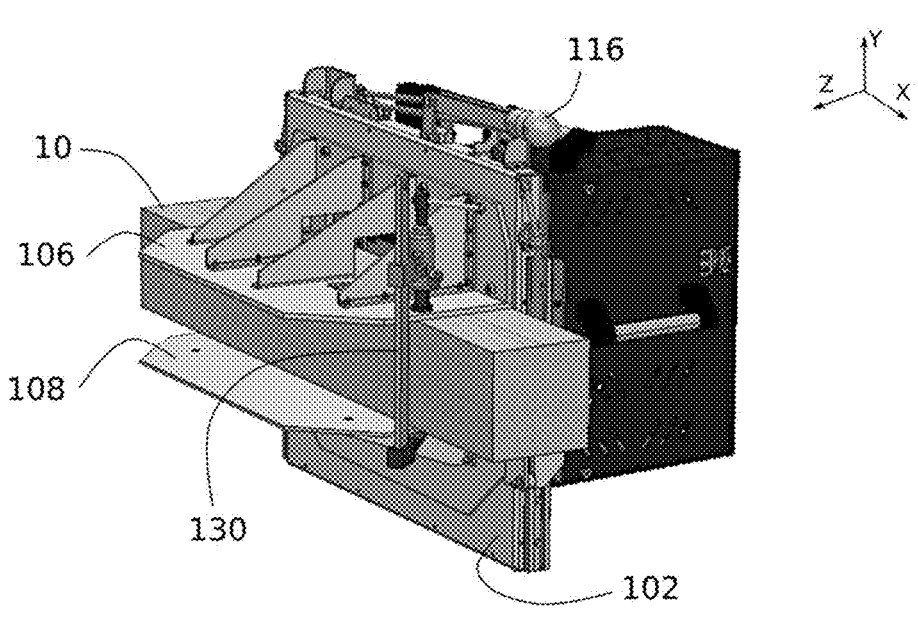
[Fig. 4]
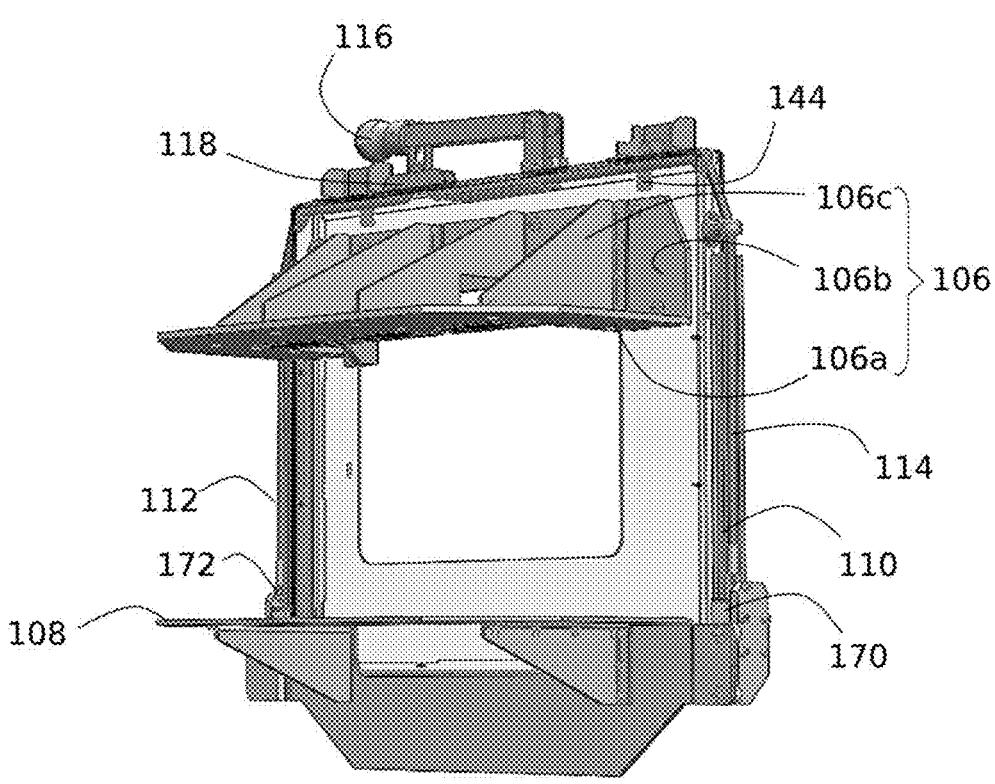

[Fig. 5]
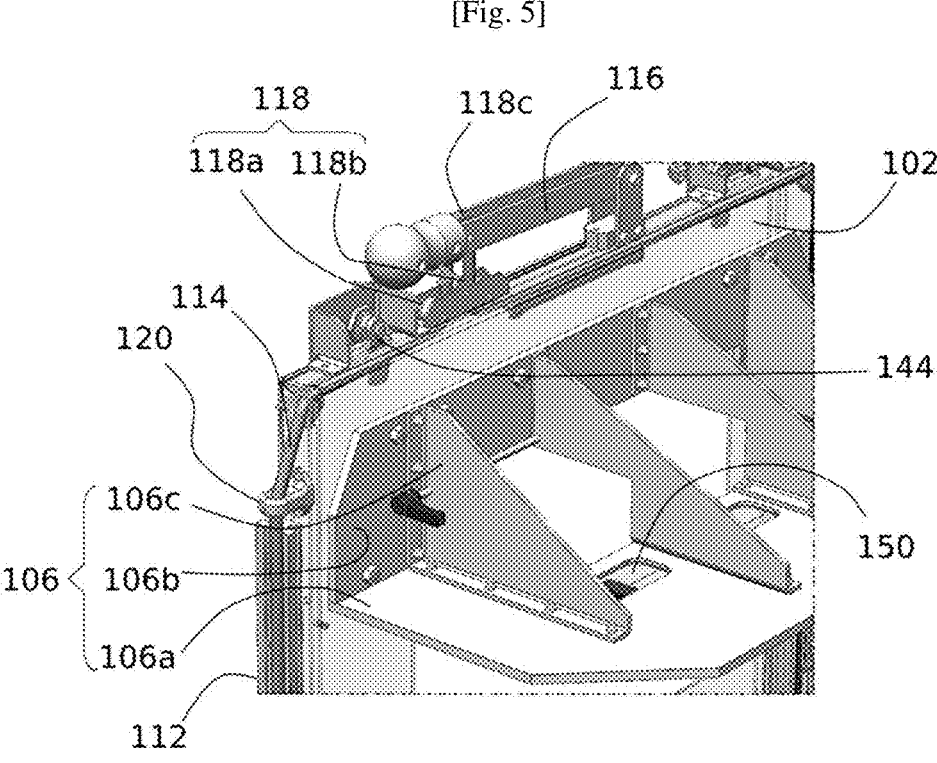
[Fig. 6]
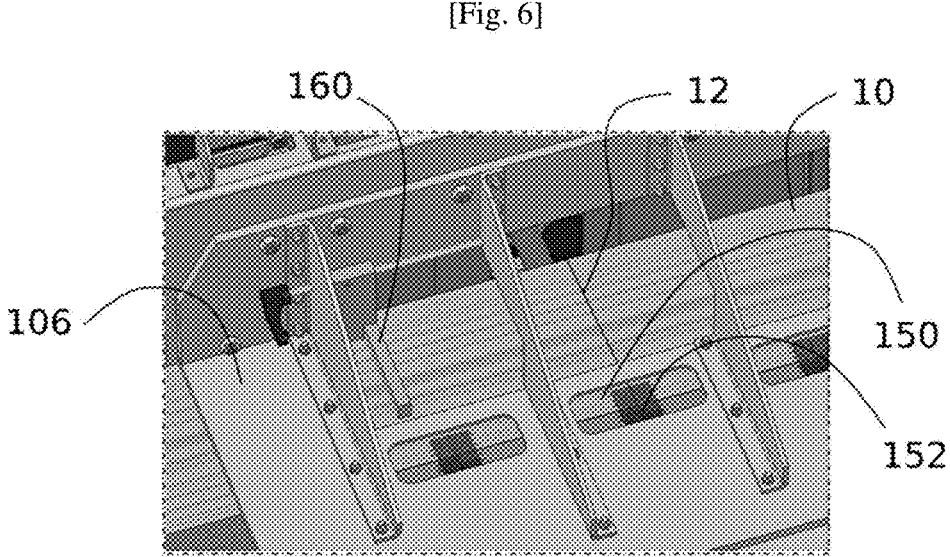

PORTABLE DEVICE FOR MACHINING A WORKPIECE

CROSS-REFERENCE TO RELATED APPLICATIONS

This application is a § 371 national phase entry of International Application No. PCT/FR2021/050105, filed Jan. 21, 2021, which claims priority to French Patent Application No. 2000758 filed on Jan. 27, 2020.

TECHNICAL FIELD OF THE INVENTION

The invention relates to a portable digital device for machining a workpiece, such as a wooden workpiece. The invention relates in particular to a portable digital machining device for the carpentry trades.

TECHNOLOGICAL BACKGROUND

There are two main families of machining devices that allow the machining of a workpiece such as a wooden workpiece.

The first family consists of manual devices, each equipped with a specific tool, such as a saw, a plane, etc., and which are directly manipulated by an operator to machine the wooden workpiece. In other words, it is the operator who moves the machining tool in relation to the workpiece and exerts the force to cut the wood. This family of devices has the advantage of being able to machine wooden workpieces directly where the workpiece is being used. On the other hand, these devices have the disadvantage of requiring the operator to handle the machining tool directly, which can lead to injuries. Furthermore, machining is less precise than with a numerically controlled machine. Finally, it is up to the operator to exert the machining force, possibly assisted by an electric motor in the case of hand-held electrical devices, which can be physically exhausting.

The second family consists of numerically (or digitally) controlled machining devices, each of which comprises a frame that rests on the floor of the machining site, a cutting tool mounted on the frame, means for automatically driving the cutting tool, and means for receiving the wooden workpiece. The cutting tool can be of different types. It can be a wood-shaping machine, a circular saw, a planer, etc.

The disadvantage of this family of machining devices is that they are relatively cumbersome and require the wooden workpiece to be moved to the machining device. The machined wooden workpiece can then be moved to its place of installation, such as a building frame. On the other hand, these machining devices have the advantage of allowing the realization of precise machining, of limiting the injuries insofar as the tool is not directly handled by the operator, and finally of limiting the fatigue insofar as the cutting tool is directly driven by a motor, which is in general an electric motor, and not by the manual force of the operator.

Document WO2004069501 describes a portable drilling device for forming mortises in wooden workpieces, for example.

This document describes in particular a device comprising elongated jaws intended to clamp between them a wooden workpiece to be drilled, guides each integral with a jaw and extending along the jaws, and crosspieces mounted on the guides carrying a platform which is mobile with respect to the crosspieces and which forms a base for receiving a drilling box. In this document, the movement of the drilling tool is achieved by moving the platform relative to the guide, that is by the means of connection between the drill housing and the jaws.

The applicant has already proposed, notably in its patent FR3050135, a machine tool that forms a new family of machining devices. The proposed machine tool is a portable device for automated machining of a wooden workpiece. Such a device comprises a frame that is attached directly to the wooden workpiece and a numerically-controlled machining head housed in the frame. This tool has the particularity of allowing the use of a numerically-controlled machining tool directly on the place of final installation of the wooden workpiece. Such a device also improves the carpenter's mobility in his workshop if necessary. In other words, it is the device that is moved towards the workpiece and not the other way around. Such a device is therefore particularly handy and suitable for all types of wooden constructions.

The applicant sought to improve its portable machining device to make it more manageable and accessible to a wide range of users.

AIMS OF THE INVENTION

The invention thus aims to provide a device for machining a workpiece, in particular a wooden workpiece, which is manageable and portable.

The invention is also intended to provide, in at least one embodiment of the invention, a machining device that allows the device to be quickly and ergonomically mounted on the workpiece, in particular a wooden one.

In particular, the invention aims to provide, in at least one embodiment of the invention, a machining device that can be used by a single operator without particular difficulties.

The invention also aims to provide, in at least one embodiment of the invention, a machining device that can ensure the safety of the operator using such a machining device.

The invention also aims to provide, in at least one embodiment of the invention, a machining device that can be attached to any part of the workpiece, in particular a wooden one (in particular at the end of the beam or on the edge of the beam).

DISCLOSURE OF THE INVENTION

To this end, the invention relates to a portable—in particular hand-carried—digitally-controlled device for machining a workpiece comprising a machining module which comprises:

- at least one machining head bearing a machining tool,
- means for moving the machining head along at least two axes perpendicular to each other;
- a digital control unit configured to control the means for moving the machining head.

The machining device according to the invention is characterized in that it further comprises a module for clamping the machining module to the wooden workpiece, the clamping module comprising:

- means for removably attaching the clamping module to the wooden workpiece,
- means for removably mounting the machining module to the clamping module.

The machining device according to the invention thus has the particularity of being composed of two main parts: the clamping module and the machining module, whereas the devices of the prior art were formed of a single part.

A machining device according to the invention is therefore portable, in particular an operator can carry it by hand.

However, there is nothing to prevent the use of a handling cart to facilitate the movement from the machining module to the clamping module, or even from the clamping module to the workpiece.

This particular structure of the machining device according to the invention thus makes it possible to simplify and streamline the operations of installing the machining device on the wooden workpiece. In particular, the machining device according to the invention allows an operator to first attach the clamping module to the workpiece in the machining area and then to mount the machining module to the clamping module.

It is also possible to mount the machining module to the clamping module before the clamping module is attached to the workpiece.

Another advantage of the device according to the invention is that it is possible to use the clamping module attached to a workpiece to mount other equipment than the machining module. Thus, the clamping module acts as an attachment plate for a workpiece processing equipment. It is also possible to use the machining module independently of the clamping module and to couple it to other receiving modules, such as a fixed base thus to form a stationary machine tool or other clamping modules configured to be attached to different types of workpieces characterized by their materials, shapes, arrangements, etc.

Furthermore, the machining device according to the invention comprises means for moving the machining head along at least 3 axes perpendicular to each other, and a digital (or numerical) control unit configured to be able to control the means for moving the machining head.

The machining of the workpiece is thus carried out in an automated way, which frees the operator from the constraints of moving the machining tool. Such a device therefore limits the risk of injury to the operator.

The machining device according to the invention is particularly intended for machining wooden workpieces. However, a device according to the invention can also be used to machine other types of workpieces, in particular plastic, concrete, meta, and, in general, any type of workpiece requiring on-site machining. The method of attaching the machining device according to the invention is independent of the material of the workpiece. It is the machining head that must be adapted to the type of material of the workpiece.

According to the invention, the mobility of the machining tool is not achieved by moving the machining module relative to the clamping module at the removable fastening means, but is achieved within the machining module. Once mounted on the clamping module, the machining module is fixed relative to the clamping module.

Advantageously and according to the invention, the clamping module comprises a flat frame adapted to be able to come at least partially to bear against an edge of the workpiece, the frame further comprising a central opening intended to allow the passage of the machining head under the control of the digital control unit when the machining module is mounted on the clamping module.

According to this advantageous variant, the clamping module has a flat frame, which allows the clamping module to be fixed to a flat edge of the workpiece. Such a module can also be fixed at the end of a workpiece or on the face of a workpiece. Furthermore, the frame has an opening that allows the machining tool to pass through to work on the workpiece to which the clamping module is attached.

Advantageously and according to the invention, the means for removably attaching the clamping module to the workpiece comprise tightening means formed by means for positioning and pre-tightening the clamping module onto the workpiece and means for the final tightening of the clamping module on the workpiece.

A device according to this advantageous variant is ergonomic and allows the device to be installed on a workpiece by a single operator.

In particular, the operator can position the clamping module and activate the means of pre-tightening the clamping module, then the means of final tightening, which allow the clamping module to be rigidly held on the workpiece.

Advantageously and according to the invention, the pre-tightening means comprise a jaw formed by two tables extending parallel to each other, respectively fixed and mobile relative to the frame of the clamping module, the mobile table being slidably mounted on the frame and connected to means for actuating the mobile table to allow its movement towards the fixed table while clamping between them the wooden workpiece.

According to this advantageous variant, the pre-tightening means comprise a jaw formed by two tables, respectively fixed and mobile relative to the frame. The fixed table can be slid relative to the fixed table.

Advantageously and according to the invention, the means for actuating the mobile table comprise:
- lateral grooves extending on both sides of the frame of the clamping module,
- linear guide shoes carried by the lateral ends of the mobile table and slidably housed in the lateral grooves,
- a belt connecting each of the two guide shoes to an operating handle carried by the frame and configured to be able to move from a first position wherein the belt extends so as to hold the mobile table at a predetermined distance from the fixed table, to at least a second position wherein the belt exerts on the mobile table an action pulling it towards the fixed table so as to be able to clamp the wooden piece between the tables.

A device according to this advantageous variant allows the movement of the mobile table relative to the fixed table to be actuated by a linear guide mechanism. This linear guide mechanism comprises a belt, a handle and guide shoes carried by the lateral ends of the mobile table and housed in lateral guide grooves of the clamping module's frame. Such a mechanism is free of bending on the guide rails and allows the sliding of the mobile table relative to the fixed table by an action on the operating handle by an operator.

According to one variant, the predetermined distance corresponds to the maximum distance of separation between the fixed and mobile tables. In other words, and according to this advantageous variant, in the first position, the belt is slackened so that the mobile table connected to the belt moves away from the fixed table by gravity while maintaining a maximum distance.

Advantageously and according to the invention, the operating handle is mounted so as to be rotatable on the frame along an axis perpendicular to the frame, and the belt is an elastic belt which connects each guide shoe and the operating handle, passing through a return pulley integral with the frame and having an axis parallel to and distant from the axis of rotation of the handle.

This advantageous structure uses a return pulley whose axis is offset from the pivot axis of the operating handle, so that the apparent length of the belt between the handle and the guide shoes can be varied by simply rotating the operating handle about the handle's axis of rotation.

According to this variant, the belt is elastic and can for example be formed by a bungee cord. Thus, it is the elasticity of the belt that allows both a long stroke of the mobile table but also a sufficient clamping of the workpiece, regardless of how open the jaw is (that is the distance between the fixed table and the mobile table, which depends on the thickness of the workpiece).

Advantageously and according to the invention, the clamping module further comprises friction pieces housed on the perimeter of the frame which enclose the elastic belt.

According to this advantageous variant, the sliding of the elastic belt takes place by means of friction parts.

The return pulley may, for example, comprise two sheaves mounted on the frame which cooperate with a sheave mounted on the operating handle so as to form a path which, for example, starts from a first clamping shoe, passes through a sheave carried by the frame, then through a sheave carried by the operating handle, then through another sheave carried by the frame and finally connects the second clamping shoe.

Advantageously and according to the invention, the final tightening means comprise at least one clamp configured to be able to extend on either side of the workpiece, once the clamping module has been fixed to the wooden workpiece, by exerting opposing forces on the fixed and mobile tables of the pre-tightening means.

Such a final tightening means is particularly easy to implement by a single operator and can be adapted to different types of workpieces (size, material, etc.). Such a final tightening means is therefore both versatile and robust to ensure the necessary holding of the clamping module on the workpiece.

Advantageously and according to the invention, the device further comprises means for referencing the machining device with respect to the workpiece.

These referencing means allow the machining module to be referenced to the workpiece in order to ensure the precision of the machining.

Advantageously and according to this variant, the referencing means comprise a viewing window equipped with a mark intended to be positioned by an operator opposite a visual mark on the wooden workpiece.

A device according to this variant allows an operator to simply align the workpiece, on which an alignment line is drawn, with a mark borne by the viewing window.

Advantageously and according to this variant, the viewing window is carried by the fixed table of the tightening means.

Advantageously and according to the invention, the means for removably mounting the machining module on the clamping module comprise:

a peripheral shoulder provided on the clamping module shaped around the perimeter of the machining module so as to form a housing for receiving the machining module, pivoting locking tabs mounted on the clamping module and configured to be movable from a first position wherein the machining module is freely insertable into the receiving housing formed by the peripheral shoulder to a second position wherein the pivoting locking tabs are pivoted and provide for the clamping of the machining module against the clamping module and prevent the machining module from becoming dislodged.

A device according to this advantageous variant makes it possible to mount and attach the machining module to the clamping module, once the clamping module is attached to the workpiece. Of course, other fastening means can be used to mount and fasten the machining module to the clamping module without substantially changing the effects of the invention.

The invention also relates to a machining device characterized in combination by all or some of the features mentioned above or below.

LIST OF FIGURES

Further aims, features and advantages of the invention will become apparent upon reading the following description, which is provided solely by way of non-limiting example, and which refers to the accompanying drawings, in which:

FIG. 1 is a schematic perspective view of a machining device according to an embodiment of the invention.

FIG. 2 is a schematic perspective view of the machining device of FIG. 1 mounted on the end of a wooden workpiece.

FIG. 3 is a schematic perspective view of the machining device of FIG. 1 mounted on the edge of a wooden workpiece.

FIG. 4 is a schematic perspective view of the clamping module of the machining device of FIG. 1.

FIG. 5 is a schematic perspective view of a detail of FIG. 4.

FIG. 6 is a schematic perspective view of a detail of FIG. 3 illustrating the positioning means of the clamping module.

DETAILED DESCRIPTION OF ONE
EMBODIMENT OF THE INVENTION

For the sake of illustration and clarity, scales and proportions are not strictly adhered to in the drawings. Throughout the detailed description which follows with reference to the figures, unless otherwise indicated, each element of the machining device is described as it is arranged when the machining device of which it is part is mounted on a workpiece. This configuration is shown in particular in FIGS. 2 and 3. Identical, similar or analogous elements are denoted using the same reference signs throughout the figures.

Furthermore, the X, Y, Z triad defines the three spatial directions wherein the machining head can be moved. In the figures, the Y-direction is defined by gravity, the Z-direction is defined by the perpendicular to gravity and the plane of the clamping module's frame, and the X-direction is the perpendicular to the Y-direction and the Z-direction.

FIG. 1 schematically shows a machining device according to one embodiment of the invention.

The device comprises a clamping module 100 configured to be attachable to a workpiece 10 via removable attachment means, described later; and a machining module 200 for mounting to the clamping module 100 via removable mounting means, described later.

FIG. 2 shows schematically the assembly formed by the clamping module 100 and the machining module 200 mounted on a wooden workpiece 10.

As will be described later, this is accomplished by first attaching the clamping module 100 to the wooden workpiece 10, and then mounting the machining module 200 to the clamping module 100.

FIG. 2 shows a mounting of the machining device on the end of a wooden beam 10 and FIG. 3 shows a mounting of the machining device on the edge of a wooden beam 10.

In the following, the structure and operation of the machining module 100 and the clamping module 100 will be described in more detail.

The machining module 200 comprises, and as represented in FIG. 1, a frame 210 housing a machining head not shown in the figures for clarity. The frame is made of sheet metal, for example, and has a plurality of ventilation openings. The machining head includes, for example, a tool holder configured to receive a machining tool such as a wood cutter. The machining head is mounted movably with respect to and within the frame 210, for example by means of ball-bearing slides or any equivalent means. The movement of the machining head on each axis is ensured, for example, by a stepper motor configured to rotate a worm. The operating principle of the machining module as such is, for example, that described in application EP3235612 in the name of the applicant.

The machining module 200 further comprises a digital control unit, not shown in the figures, and configured to be able to control the movement motors of the machining head. This control unit is, for example, controlled by a touch screen remote control intended to be manipulated by the operator controlling the machining of the wooden workpiece 10 by the machining device according to the invention.

Finally, the machining module 200 comprises an interface plate 220 bolted to the frame 210 via fins 230 that extend on either side of the frame 210. This board 220 is configured to fit into a receiving housing 140 provided in the clamping module 100 as described later.

The clamping module 100 comprises a generally rectangular frame 102. The frame 102 comprises a peripheral shoulder 142 that defines the housing 140 for receiving the interface plate 220 of the machining module. In other words, the receiving housing 140 bounded by the peripheral shoulder 142 is conformed to the interface plate 220 of the machining module 200.

The frame 102 also has an opening 104 for the machining tool of the machining module 200 to pass through when the machining module is mounted and secured to the clamping module.

The clamping module 100 also comprises two tables 106, 108 extending parallel to each other and defining a clamping jaw for the wooden workpiece 10. Preferably and as shown in the figures, the fixed table 106 is the upper table and the mobile table 108 is the lower table. Of course, according to another embodiment, the mobile table can be the upper table and the fixed table the lower table.

Each table is, for example, formed from an L-shaped piece. More specifically, considering the table 106 shown in FIGS. 4 and 5, the base of the L forms a clamping wall 106a and the longitudinal portion of the L forms a wall for attachment 106b to the frame 102. Furthermore, the table 106 comprises a plurality of brackets 106c that connect the clamping wall 106a to the attachment wall 106b to stiffen the clamping table.

The table 108 has, according to the embodiment of the figures, an inverted L-shaped structure. The longitudinal part of the L forms a guide wall connected to the guide shoes described later, and the base of the L forms a clamping wall for clamping the workpiece in cooperation with the clamping wall of the fixed table described earlier.

Of course, the tables may have other structures to form the clamping jaw of the pre-tightening means.

The clamping module also comprises a viewing window 150, visible in particular in FIGS. 5 and 6, equipped with a marker 152 intended to be positioned by an operator opposite a visual marker 12 on the workpiece 10. This positioning marker can, for example, be a graduated marker to allow specific positioning of the clamping module with respect to the reference line drawn on the workpiece.

This viewing window 150 is, according to the embodiment of the figures, carried by the fixed table 106 of the pre-tightening means. Thus, according to this embodiment, the viewing window is a transparent portion of the fixed table, and more particularly of the wall 106a of the fixed table.

According to a preferred embodiment, the clamping module may also comprise a retractable lateral mechanical stop 160 configured to allow the referencing and lateral locking of the clamping module onto the edge of the wooden workpiece when arranging the clamping module onto the end of the workpiece.

Furthermore, and as also shown in FIGS. 4 and 5, the frame 102 comprises two lateral grooves 110 and 112.

Each lateral groove receives a guide shoe 170, 172 integrally connected to each lateral end of the mobile table 108. Each skid is configured to slide in the lateral groove of the frame 102.

The clamping module 100 also comprises an elastic belt 114 which connects each of the two guide shoes to an operating handle 116, mounted so as to be movable with respect to the frame 102 along an axis perpendicular to the plane of the frame, passing through a return pulley 118 integral with the frame 102 and having an axis parallel to and distant from the axis of rotation of the handle.

The combination of the lateral grooves, the guide shoes, the elastic belt, the operating handle and the return pulley form means for actuating the pre-tightening means of the clamping module formed by the fixed table 106 and by the mobile table 108.

In particular, by pivoting the operating handle 116, the operator exerts a traction on the elastic belt which drives the sliding guide shoes in the lateral grooves and thus the clamping of the jaw formed by the tables 106 and 108.

As shown in FIG. 5, the return pulley 118 is formed by two sheaves 118a and 118b that cooperate with a sheave 118c carried by the handle 116.

This allows the belt 114 to circulate from a first clamping shoe, then through sheave 118a, then through sheave 118c carried by operating handle 116, then through sheave 118b, until it reaches the second clamping shoe of table 108. Thus, it is well understood that when the handle 116 is pivoted, the belt will stretch due to the movement of the sheave 118c with respect to the sheaves 118a, 118b carried by the frame, and thus cause the movement of the mobile table by sliding of the guide shoes in the lateral grooves.

As shown in FIG. 5, the clamping module 100 further comprises friction rings 120 arranged around the perimeter of the frame 102 to hold the elastic belt in position around the perimeter of the frame.

The clamping module 100 also comprises, as represented in FIGS. 2 and 3, a clamp 130 forming means for final tightening of the clamping module to the workpiece 10. This clamp can be of any known type. It is designed to attach the clamping module to the wooden workpiece.

Once the clamping module has been attached to the wooden workpiece, both by the actuation of the pre-tightening means and by the clamp, the machining module 200 can be mounted on the clamping module 110.

This assembly is achieved by fitting the frame 220 of the clamping module into the reception housing 140 formed by the peripheral shoulder 142, visible in FIG. 1.

Once the plate 220 of the machining module is housed in the receiving slot 140, an operator can operate pivoting locking tabs 144, visible in FIG. 5 and transparent in FIG. 4. These locking tabs 144 are mounted on the frame 102 of the clamping module and are configured to allow movement from a first position wherein the machining module 200 can be freely inserted into the receiving slot 140 to a second position wherein the pivoting locking tabs 144 are pivoted and thus ensure that the machining module 200 is placed against the clamping module 100 and thus prevent the machining module from coming dislodged. In combination, mechanical means for embedding the lower part of the plate in the shoulder 142 can be provided to help hold the machining module in the clamping module.

The machining device can then be used to machine the workpiece 10 on which the device is mounted.

A machining device according to the invention may also comprise a protective cloth for the machining area, not shown in the figures. For example, such a protective cloth is mounted on both sides of the machining area and connected to rollers so that the machining area can be closed after the machining device has been mounted on the wooden workpiece. These rollers extend, for example, along the lateral sliding rails of the guide shoes and are connected to the frame by lateral wings. Once the machining device is attached to the workpiece, the operator can pull the protective cloth from the rollers to cover the machining area. There can be one roller on each side, where the cloths of each roller are extended to the workpiece, or there can be one roller on one side of the module, which allows the protective cloth to be extended to the other side of the machine. A cloth locking means, such as a hook, can then be provided to hold the cloth in position during machining.

Naturally, the invention is not limited to only the embodiment described with reference to the figures. Furthermore, other means may be provided to facilitate the use of the device according to the invention. For example, the clamping module and the machining module can each comprise one or more handles for carrying the module to facilitate the movement and positioning of the module by an operator.

The invention claimed is:

1. A portable digitally controlled device for machining a workpiece, comprising a machining module;

a clamping module for clamping the machining module to the workpiece, the clamping module comprising:

means for removably attaching the clamping module to the workpiece, means for removably mounting the machining module to the clamping module;

a flat frame adapted to be able to come at least partially to bear against an edge of the workpiece, wherein the means for removably attaching the clamping module to the workpiece comprise tightening means formed by means for positioning and pre-tightening the clamping module onto the workpiece and means for final tightening of the clamping module onto the workpiece, wherein the means for positioning and pre-tightening the clamping module onto the workpiece comprise a jaw formed by two tables extending parallel to each other, respectively fixed and mobile relative to the frame of the clamping module, the mobile table being slidably mounted on the frame and connected to means for actuating the mobile table to allow movement of the mobile table towards the fixed table while clamping the workpiece between them, wherein the means for actuating the mobile table comprises:

a first lateral groove extending on one side of the frame of the clamping module and a second lateral groove extending on the other side of the frame of the clamping module, a first linear guide shoe carried by one lateral end of the mobile table and slidably housed in the first lateral groove and a second linear guide shoe carried by the other lateral end of the mobile table and slidably housed in the second lateral groove, a belt connecting each of the first and second guide shoes to an operating handle carried by the frame and configured to be movable from a first position wherein the belt extends so as to hold the mobile table at a predetermined distance from the fixed table to at least a second position wherein the belt exerts on the mobile table an action pulling the mobile table towards the fixed table so as to be able to clamp the workpiece between the fixed and mobile tables.

2. The machining device according to claim 1, wherein:

the operating handle is rotatably mounted on the frame along an axis perpendicular to the frame, the belt is an elastic belt that connects each guide shoe and the operating handle, passing through a return pulley integral with the frame and having an axis parallel to and distant from the axis of rotation of the operating handle.

3. The machining device according to claim 2, further comprising friction pieces housed on the perimeter of the frame which enclose the elastic belt.

4. The machining device according to claim 1, wherein the means for final tightening of the clamping module onto the workpiece comprises at least one clamp configured to be able to extend on either side of the workpiece, once the clamping module has been fixed to the workpiece, by exerting opposing forces on the fixed and mobile tables of the means for positioning and pre-tightening the clamping module onto the workpiece.

5. The machining device according to claim 1, wherein the device further comprises means for referencing the machining device with respect to the workpiece.

6. The machining device according to claim 5, wherein the means for referencing the machining deice comprises a viewing window equipped with a marker intended to be positioned by an operator opposite a visual marker on the workpiece.

7. The machining device according to claim 6, wherein the viewing window is carried by the fixed table of the pre-tightening means.

8. The machining device according to claim 1, wherein the means for removably mounting the machining module to the clamping module comprises:

a peripheral shoulder provided on the clamping module shaped around the perimeter of the machining module so as to form a housing for receiving the machining module, pivoting locking tabs mounted on the clamping module and configured to be movable from a first position wherein the machining module is freely insertable into the receiving housing formed by the peripheral shoulder to a second position wherein the pivoting locking tabs are pivoted and provide for the clamping of the machining module against the clamping module and prevent the machining module from becoming dislodged.

9. The machining device according to claim 1, wherein the workpiece is a wooden workpiece.

\* \* \* \* \*